United States Patent [19]

Jensen

[11] 4,122,434
[45] Oct. 24, 1978

[54] TEST SYSTEM FOR TRAILER BRAKE MECHANISM

[75] Inventor: William K. Jensen, Royal Oak, Mich.

[73] Assignee: O.E.M. Technical Sales, Inc., Southfield, Mich.

[21] Appl. No.: 836,334

[22] Filed: Sep. 26, 1977

[51] Int. Cl.² .............................................. B60T 17/22
[52] U.S. Cl. ..................................... 340/52 B; 303/20
[58] Field of Search ................... 340/52 B, 69; 303/20

[56] References Cited

U.S. PATENT DOCUMENTS 3,840,276   10/1974   Jubenville .............................. 303/20

Primary Examiner—Alvin H. Waring
Attorney, Agent, or Firm—Reising, Ethington, Barnard, Perry & Brooks

[57] ABSTRACT

An electrically controlled brake system for a towed vehicle such as a house trailer and means for selectively testing the operability of such system both prior to and during towing operation.

3 Claims, 4 Drawing Figures

TEST SYSTEM FOR TRAILER BRAKE MECHANISM

The present invention relates to an electrically controlled brake system for a towed vehicle such as a house trailer and means for selectively testing the operability of such system. Due to its weight, a towed vehicle such as a house trailer must have an independent braking system if the combined towing and towed vehicles are to be adequately controlled during braking situations. In other words, the added mass of a towed vehicle such as a house trailer renders the braking system of a towing vehicle alone inadequate to provide safe braking capacity for both the towing and towed vehicles.

Accordingly, it is normal practice to utilize an independent electrically actuated brake system on a towed trailer and wherein the trailer braking system is controlled either by the actuation of the towing vehicle brake system or by an independent control member located in the towing vehicle. The trailer braking system is adapted to be connected to the towing vehicle electrical system by a suitable electrical coupling device. While the vehicle operator may have ostensibly coupled the towing vehicle electrical system to the electrical braking system of the towed vehicle, it is possible that the two electrical systems are not, in fact, operatively coupled.

It is the purpose of the present invention to provide an electrical testing circuit to indicate to the towing vehicle operator that the towed vehicle braking system is electrically operative. More specifically, it is an object of the present invention to provide a system which can selectively test certain portions of the electrical braking system to more readily locate malfunctioning components. For example, through the use of an operator controlled switch mechanism, that portion of the electrical brake system which includes the test circuit itself can be energized to be certain that it is operative after which the switch can be moved to another position to determine the operability of the remainder of the electrical braking system.

BACKGROUND OF THE INVENTION

In a typical electrically controlled trailer braking system, the towing vehicle or car includes an electrical power source such as a battery which is used to power all of the electrical components of the car. The towed vehicle or trailer includes a solenoid actuated braking mechanism on each of the trailer wheels. When a trailer is mechanically coupled to a car to provide a tandem towing arrangement, a separate means is provided for electrically coupling the car storage battery to the trailer brake solenoids. The brake pedal or a separate control means of the towing car operates a variable resistor or voltage divider which controls the amount of electrical current flowing from the car battery to the trailer brake solenoids and thereby controls the trailer braking effort. Thus, assuming the trailer and car systems are electrically coupled, as the car operator applies the brakes of the towing vehicle, the trailer brakes will also be applied.

As is shown in U.S. Pat. No. 3,840,276 Jubenville, it is known to provide a safety or warning light which will indicate that a supplementary portion of a vehicle braking system is operative. However, Jubenville relates to an electrical trailer braking system adapted to control oscillations or swaying of the trailer relative to the towing vehicle. Jubenville's warning light relates only to the oscillation controlling part of his braking system and does not indicate whether the basic trailer braking system is operative. Nor does Jubenville provide means for selectively testing the operability of portions of the basic trailer braking system.

PRESENT INVENTION

The electrical trailer braking system incorporating the present invention includes trailer brake actuating solenoids and disconnectable coupling means for electrically connecting the solenoids with the towing vehicle battery. The towing vehicle brake operates a variable resistor or voltage divider which determines the amount of current flowing from the car battery to the trailer brake solenoids. The subject invention includes a testing circuit connected in series-parallel with respect to that portion of the braking circuit which is adapted to supply a variable voltage or current from the car battery to the trailer brake solenoids. In the modification hereinafter shown and described, the test circuit is connected in series-parallel with respect to the battery and brake solenoids. The test circuit includes a monitoring lamp connected in series with a multiple contact switching device. The switch device includes a single pole, double throw element, a first grounded contact and a second contact adapted to complete the series-parallel test circuit. The movable switch member includes a first position out of contact with either of the other contacts thereby disconnecting the test circuit. In order to test the operability of the test circuit itself, the pole is moved into contact with the grounded contact whereby if the signal lamp is lighted, that portion of the electrical system including the test circuit is known to be operative. Should the monitoring lamp not light when the pole is in contact with the grounded contact, then the operator can check the operability of various components in that portion of the electrical system between the car battery and the test circuit. For instance, the operator would check the condition of components such as the monitoring lamp itself, the battery, the fuse or circuit breaker and the like. Once having established the operability of the electrical braking system between the battery and the test circuit, the operator will next move the movable pole of the switch to the second contact to determine the operability of the electrical system between the brake actuated variable resistor and the trailer brake solenoids. Should the monitoring lamp not light when the switch is thus moved into engagement with the second contact, the operator can next check the condition of the disconnectable electrical coupling member between the car and trailer or the brake wire connectors within the trailer and the towing vehicle.

Finally, with the movable switch member in engagement with the second contact and the monitoring lamp lighted, the operator can next depress the brake pedal to check the operability of the variable resistor or voltage divider. If the resistor is functioning properly, current will flow therethrough to the brake solenoids thereby causing a dimming of the signal lamp.

Thus, the present invention enables an operator to selectively test the operability of various portions of the electrical braking system and thereby more readily locate any malfunctioning components both prior to and during towing.

In the drawings:

FIG. 1 depicts a towing vehicle or car indicated generally at 10, and a towed vehicle or trailer 12 connected to the car through a suitable disconnectable tow bar arrangement 14.

FIG. 2 is a diagrammatic representation of the electrical control system whereby the trailer brakes are controlled either through actuation of the towing car braking system or an independent control means. Various of the components of the electrical braking system, as will be described in detail with respect to FIG. 2, are also shown generally in FIG. 1.

Figure 1:
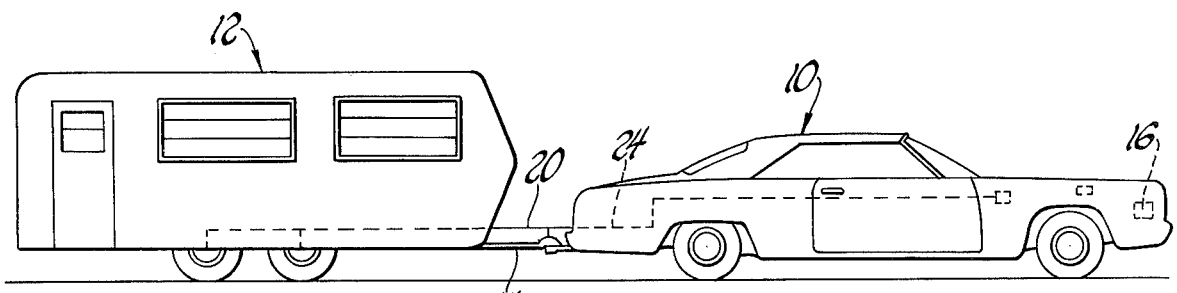
FIG. 1 illustrates a car and house trailer embodying the subject invention.
Figure 2:
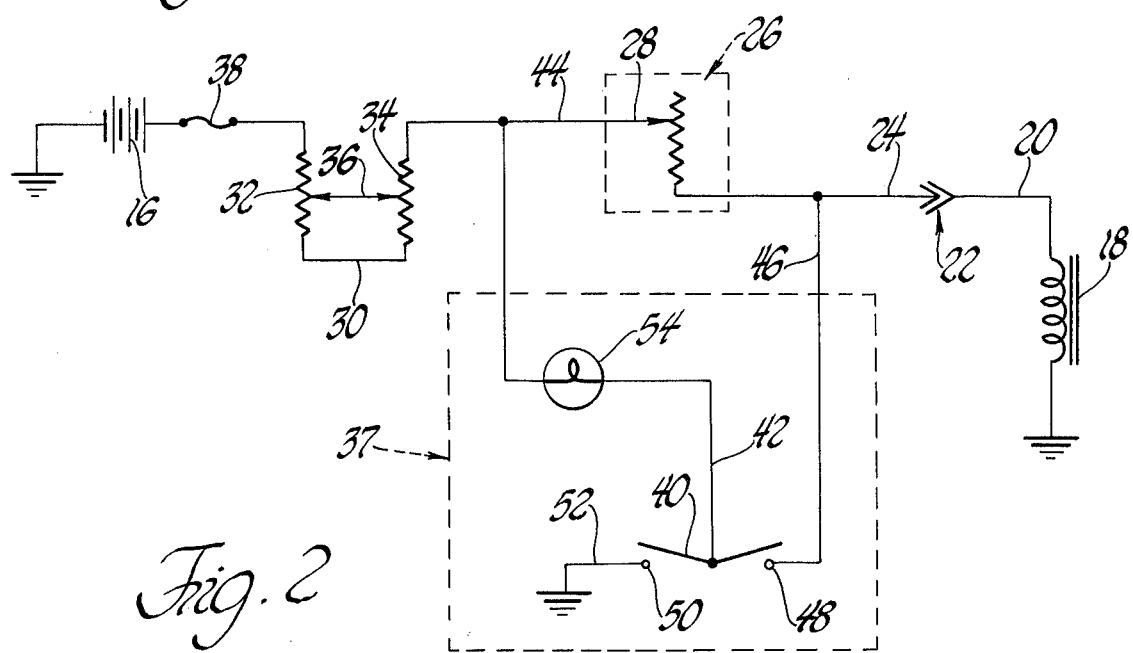
FIG. 2 is a diagrammatic representation of the electrical circuit of the trailer braking system and including the test circuit of the subject invention.

The car battery or electrical power source utilized to control the various electrical accessories of the car is indicated at 16. Only that portion of the towing car electrical system relating to the control of the trailer brakes is shown in FIG. 2. Each of the trailer wheels includes a braking device actuated through a suitable solenoid 18. Each solenoid 18 is connected through a suitable lead wire 20 mounted within the trailer and extending forwardly to one portion of a connector or disconnectable coupling 22, the other portion of which connects to a suitable lead wire 24 extending through car 10 and which wire is adapted to receive braking current from the car battery 16. Typically connected in series between connector wire 24 and battery 16 is a variable resistor or voltage divider indicated generally at 26 which, in the illustrated embodiment, includes a movable element 28 connected to the car brake pedal or is independently operated to regulate the amount of current flowing from the battery to solenoid 18 and thus regulating the amount of braking effort applied to the trailer brakes by the solenoids. An adjustable voltage controlling resistor 30 having a pair of series connected resistor elements 32 and 34 and a shorting arm 36 regulates the maximum current which may flow from battery 16 to solenoids 18. A fuse or circuit breaker 38 is disposed between battery 16 and adjustable resistor 30 to protect the braking system against electrical overloads.

Thus, with the towing vehicle or car lead 24 suitably coupled to trailer lead or wire 20, actuation of the car brake pedal will, through variable resistor 26, determine the amount of battery current flowing to solenoids 18 to control the trailer braking effort.

Towed vehicles such as house trailers are apt to weigh as much or more than a towing vehicle and, accordingly, require their own braking systems adapted to be actuated in conjunction with the towing car braking system. It is obviously extremely hazardous to tow such a trailer if its own braking system is inoperative for any reason. Therefore, it is necessary to provide a warning or monitoring lamp visible to the car operator to indicate that the trailer braking system is operative. Further, inasmuch as there are various electrical components in the brake controlling system which could malfunction and thus give a warning signal to the operator, it is particularly desirable if the operator can, through a suitable testing circuit, get some indication as to which part of the braking circuit may contain an inoperative element. It is the purpose of the present invention to provide an operator actuatable test circuit which can first determine if that part of the control circuit containing a warning or monitoring lamp is operative after which the remainder of the electrical brake circuit can be tested.

Thus, and again referring to FIG. 2 of the drawings, a test circuit is indicated generally at 37 and is connected in series-parallel with respect to battery 16 and brake solenoids 18. The test circuit includes a single pole, double throw switch element 40 which is movable between several positions. The movable switch element 40 is connected through a suitable lead 42 to battery lead 44 between adjustable resistor 30 and the brake actuated variable resistor 26. The test circuit includes another lead wire 46 connected to the variable resistor output lead 24 intermediate variable resistor assembly 26 and coupling 22. The other end of lead 46 terminates in switch contact 48. A second switch contact 50 is connected through wire 52 to ground. A warning or monitor lamp 54 is connected in series with test circuit lead wire 42.

After trailer 12 has been mechanically coupled to car 10 through tow bar arrangement 14 and the car electrical system has been electrically coupled through connector 22 with the trailer electrical brake system, the operator will wish to determine that the trailer braking system is operative. To this end, the operator will move the movable switch element 40 from its neutral or off position as shown in FIG. 2, into electrical contact with the grounded switch contact 50. If the warning or monitor light 54 now lights, the operator knows that the circuits between battery 16 and grounded contact 50 are conductive. With the movable switch element 40 in engagement with grounded contact 52, should monitor light 54 not light, then the operator has determined that some portion of the electrical circuit between the vehicle battery 16 and the testing circuit is inoperative. In such condition, the operator can test for the operability of various components in the system. For example, the operator would most naturally check to see if he had a dead battery. Next the operator could test to see whether fuse or circuit breaker 38 had been opened due to a circuit overload or whether the adjustable resistor 30 was inoperative. Likewise, the operator would check the condition of monitoring lamp 54 or ground connection 52. Having determined which of the aforementioned electrical components had malfunctioned and corrected the same, monitoring lamp 54 will light when switch element 40 is held in contact with grounded contact 50. The operator will next proceed to move the movable switch element 40 into engagement with switch contact 48. Under this condition and if the monitoring lamp 54 lighted, the operator would know the circuits between battery 16 and contact 48 were conductive. On the other hand, should monitoring lamp 54 not light, the operator would then check the condition of electrical coupling 22, trailer lead wire 20 and towing car lead wire 24 to correct any malfunction in this part of the electrical system.

As a final check and with movable switch element 40 in engagement with contact 48, the car operator would depress the brake pedal to actuate voltage divider 26. If the voltage divider 26 is functioning properly, current will flow from battery 16 through leads 44, 24, and 20 to brake solenoids 18 causing monitor light 54 to dim.

Since the car operator should always be aware of the operability of the trailer braking system when the trailer is in tow, movable switch element 40 should be left in the "on" position in engagement with contact 48. In this manner the trailer brake system will be known to be operative as long as monitor lamp 54 is lighted.

In order to avoid a false reading as to the operability of the entire trailer braking circuit, movable switch element 40 should only be engageable with "test" contact 50 when held in such position by the operator. In other words, element 40 should be biased out of engagement with contact 50. On the other hand, element 40 should be snappable to the "on" position to maintain monitoring lamp 54 in an operative mode when the trailer is in tow.

If desired, two monitoring lamps could be substituted for lamp 54. In such case, one such lamp can be disposed in ground lead 52 and a second lamp in lead 46.

Figure 3:
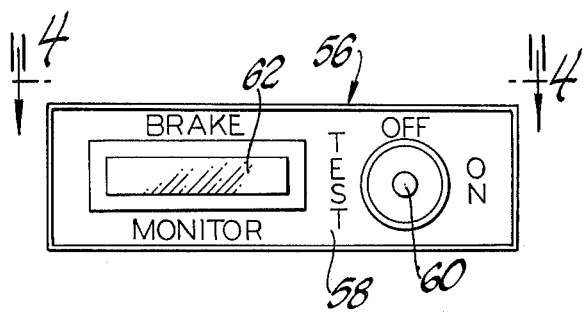
FIG. 3 is a front elevational view of a test circuit containing housing adapted to be mounted near the towing car operator.
Figure 4:
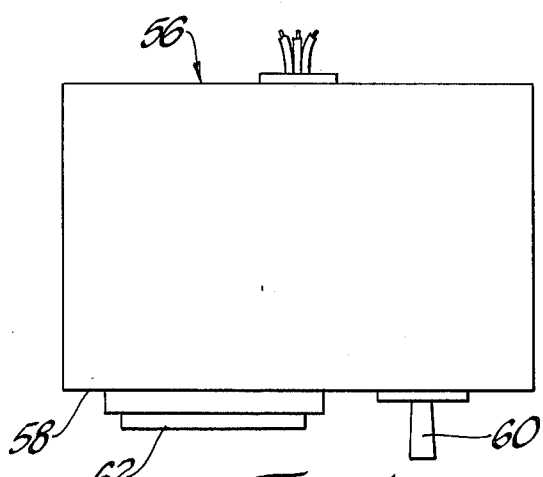
FIG. 4 is a plan view of the housing of FIG. 3.

Test circuit 36 is conveniently disposed in a compact housing 56 as shown in FIGS. 3 and 4. Housing 56 includes a front face 58 through an opening in which a lever portion 60 of movable switch contact 40 projects so as to be accessible by the towing car operator. Another opening is formed in housing face 58 and within which opening a suitably colored lens 62 is disposed. Monitoring lamp 54 is mounted in housing 56 immediately behind housing lens 62 whereby the lens will be illuminated when the lamp is lighted. Should two lamps be used in place of the single monitoring lamp 54, a pair of different colored lenses could be substituted for lens 62.

Other modifications may be made within the intended scope of the invention as set forth in the hereinafter appended claims.

The embodiments of the present invention in which an exclusive property or privilege is claimed are defined as follows:

1. A control circuit for a towed vehicle brake system of the type wherein the brake system of a towing vehicle controls the actuation of the braking of the towed vehicle, said control circuit including
    (1) battery means (16) disposed in the towing vehicle,
    (2) solenoid actuated brake means (18) associated with each wheel of the towed vehicle,
    (3) first conductor means (44, 24) leading from said battery means,
    (4) second conductor means (20) leading from said brake solenoids,
    (5) means (22) for disconnectably coupling said first and second conductor means,
    (6) a towing vehicle operator actuated voltage divider (26) for regulating the current flow through said first and second conductor means, and
a secondary test circuit (37) connected in series-parallel between said battery means and said brake solenoids, said test circuit including
    (1) third and fourth conductor means (42 and 46) respectively connected at one end to said first conductor means,
    (2) switch means adapted to interconnect said third and fourth conductor means, said switch means including
        (a) a first grounded contact,
        (b) a second contact connected to the other end of said fourth conductor means, and
        (c) a movable contact connected to the other end of said third conductor means,
    (3) monitoring lamp means adapted to be connected in series with said movable contact,
said movable contact being engageable with said grounded contact to energize said lamp means when the circuits are conductive between said battery means and said grounded contact, said movable contact being engageable with said second contact to energize said lamp means when the circuits are conductive between said battery means and said second contact.

2. A control circuit for a towed vehicle as set forth in claim 1 wherein said secondary test circuit includes a housing (56) disposed proximate the operator of the towing vehicle, said switch means being disposed within said housing such that said movable contact includes a lever portion (60) projecting exteriorly of one face (58) of said housing, lens means (62) mounted in said one face of the housing proximate the lever portion of the movable contact, said monitoring lamp means being mounted in said housing immediately behind said lens means.

3. A control circuit for a towed vehicle brake system of the type wherein the towing vehicle operator is able to control the actuation of the braking of the towed vehicle; said towing vehicle including battery means (16), a towing vehicle operator controlled voltage divider (26), a first conductor element (44) connecting said battery means and said voltage divider, a circuit breaker (38) disposed in said first conductor element, an adjustable resistance means (30) disposed in said first conductor element intermediate said circuit breaker and the voltage divider, and a second conductor element (24) leading from said voltage divider; said towed vehicle including solenoid actuated brake means (18), a third conductor element (20) connected to said solenoid actuated brake means; means (22) for disconnectably coupling said second and third conductor elements; and means (36) for testing the operability of said control circuit, said testing means including
    (1) a fourth conductor element (42) connected at one end to said first conductor element intermediate said adjustable resistance means and said voltage divider,
    (2) a fifth conductor element (46) connected at one end to said second conductor element between said voltage divider and said coupling means,
    (3) switch means adapted to interconnect said fourth and fifth conductor elements, said switch means including
        (a) a first grounded contact (50),
        (b) a second contact (48) connected to the other end of said fifth conductor element, and
        (c) a movable contact (40) connected to the other end of said fourth connector element; and
    (4) monitoring lamp means (54) adapted to be connected in series with the movable contact of said switch means,
said movable contact being engageable with said grounded contact to energize said lamp means when the control circuits are conductive between the battery means and the grounded contact, said movable contact being engageable with said second contact to energize said lamp means when the control circuits are conductive between the battery means and the second contact, said movable contact being movable to an intermediate position out of contact with both said grounded contact and said second contact whereby said testing means is rendered inoperative.

* * * * *